United States Patent
Sasaki

(10) Patent No.: US 7,916,340 B2
(45) Date of Patent: Mar. 29, 2011

(54) PRINT SYSTEM, AN IMAGE SUPPLY APPARATUS AND CONTROL METHODS THEREOF

(75) Inventor: Futoshi Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 844 days.

(21) Appl. No.: 11/778,152

(22) Filed: Jul. 16, 2007

(65) Prior Publication Data

US 2008/0018744 A1    Jan. 24, 2008

(30) Foreign Application Priority Data

Jul. 20, 2006    (JP) ................................ 2006-198707

(51) Int. Cl.
*H04N 1/393* (2006.01)
(52) U.S. Cl. .......................... 358/1.2; 358/451; 382/298
(58) Field of Classification Search .................. 358/1.1, 358/1.2, 1.9, 1.15, 448, 451; 382/298, 299
See application file for complete search history.

(56) References Cited

U.S. PATENT DOCUMENTS 7,548,339 B2 *   6/2009   Imai et al. .................... 358/1.18
2005/0219555 A1 *   10/2005   Onuma et al. ................. 358/1.1

FOREIGN PATENT DOCUMENTS

JP      10-290470     10/1998
JP      2003-134457     5/2003

* cited by examiner

*Primary Examiner* — Thomas D Lee
(74) *Attorney, Agent, or Firm* — Cowan, Liebowitz & Latman, P.C.

(57) ABSTRACT

A print system in which an image supply apparatus and a print apparatus directly communicate with each other, and the print apparatus prints an image based on image data supplied from the image supply apparatus, the image supply apparatus comprises a designating unit adapted to designate a print image from image data which is stored in a storage unit; a setting unit adapted to set a printing condition including a trimming range and a print size of the print image; a modifying unit adapted to resize image data of the print image based on the printing condition set by the setting unit; and a transferring unit adapted to transfer the image data of the print image resized by the modifying unit, and information of the trimming range to the print apparatus, the print apparatus prints an image based on the image data and the information of the trimming range.

16 Claims, 12 Drawing Sheets

BORDERED PRINT

BORDERLESS PRINT

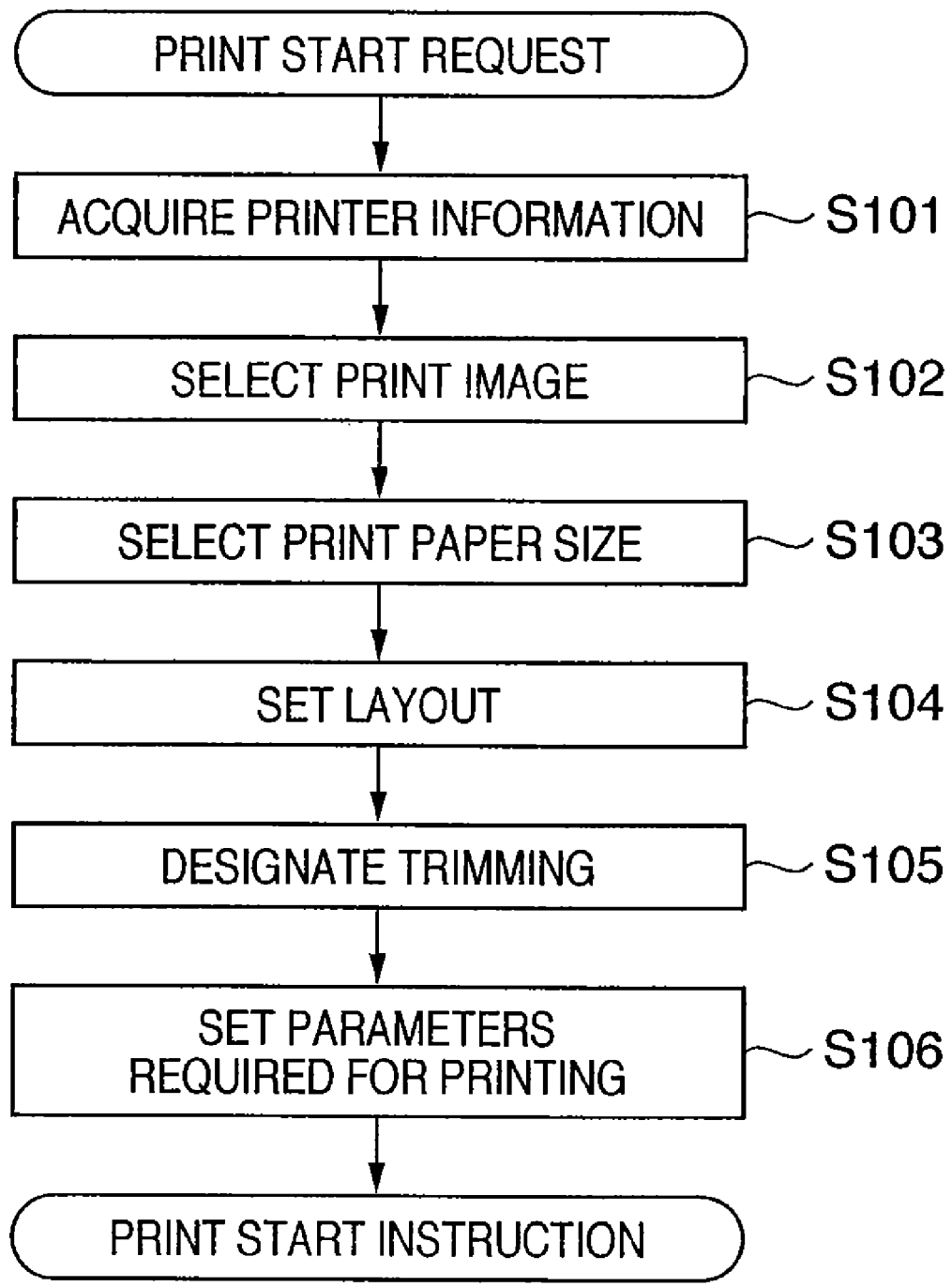

PRINT SYSTEM, AN IMAGE SUPPLY APPARATUS AND CONTROL METHODS THEREOF

BACKGROUND OF THE INVENTION

1. Field of the Invention

The present invention relates to a direct print technique for printing an image by directly connecting a digital camera or the like to a printer.

2. Description of the Related Art

A so-called digital camera direct print system has prevailed. In this system, a printer and digital still camera (to be abbreviated as DSC hereinafter) are directly connected via an interface such as USB or the like, and images saved in the DSC are transferred to and printed by the printer.

In the digital camera direct print system, each image file stored in the DSC is defined as a print designation file of a standard format called DPOF (Digital Print Order Format). The user designates an image to be printed as a DPOF file, and transfers it to the printer, thus printing that image.

In a communication standard between the DSC and printer proposed by such digital camera direct print system, transfer of image data from the DSC to the printer is made using an image file format such as JPEG, TIFF, or the like.

In recent years, the resolution of an image captured by a DSC has been increasing exponentially, and a DSC having a resolution of 16 million pixels is commercially available. However, even when image data captured by a DSC with such a high resolution is transferred in a JPEG format to a printer intact, the transfer is wasteful since the printer does not require image data of such a large size, depending on an image size to be printed. Moreover, for a printer with a small memory size, image data with such a large size may cause a memory overflow.

To cope with such situations, Japanese Patent Laid-Open No. 10-290470 and Japanese Patent Laid-Open No. 2003-134457 have been proposed.

Japanese Patent Laid-Open No. 10-290470 aims at reduction of the processing load on the printer. That is, the DSC executes decompression, color conversion, resizing, and the like of a JPEG file to convert that file into data of a printable format, and then transfers the converted data to the printer, thereby reducing the image-processing load on the printer.

In Japanese Patent Laid-Open No. 2003-134457, the DSC side corrects variations of the color reproduction characteristics for each printer to convert image data into a general image file such as JPEG or the like, and transfers the converted image file to the printer. In this way, a stable image can be obtained independent of the print characteristics of each printer.

Upon printing an image captured by the DSC, a print mode that designates a trimming frame is known.

In a "trimming" print mode, an original image is clipped, and the clipped image is printed to cover the entire photographic paper area based on "borderless" designation or the entire trimming-designated image can be printed based on "bordered" designation.

Also, a print mode that analyzes a captured image and applies brightness, contrast, and color correction processes to that image so as to improve the image quality is known.

Most algorithms for the brightness and contrast correction processes generate RGB and luminance histograms for the entire captured image, and analyze the histograms to correct an original image. However, upon making the trimming designation, an image is clipped and is transferred to the printer. Hence, the histograms change depending on the clipping position, and the brightness and contrast also changes.

In the "borderless" print mode, it is common practice to print an image to be larger than the photographic paper size without leaving any border. However, when an image is clipped, since there is no data of an area larger than the photographic paper size, an image of that area is cut off.

In order to solve the aforementioned problems, when an original image and trimming information are transferred to the printer, and that image is modified on the printer side, an unnecessary image part other than the trimming-designated image is also transferred, resulting in a low print speed.

SUMMARY OF THE INVENTION

The present invention has been made in consideration of the aforementioned problems, and implements a technique which can prevent the brightness and contrast from changing depending on the clipping position upon trimming and printing an image, and can print an image clipped by trimming with high precision and at high speed.

According to the present invention, there is provided a print system in which an image supply apparatus and a print apparatus directly communicate with each other, and the print apparatus prints an image based on image data supplied from the image supply apparatus, the image supply apparatus comprising: a designating unit adapted to designate a print image from image data which is stored in a storage unit; a setting unit adapted to set a printing condition including a trimming range and a print size of the print image; a modifying unit adapted to resize image data of the print image based on the printing condition set by the setting unit; and a transferring unit adapted to transfer the image data of the print image resized by the modifying unit, and information of the trimming range to the print apparatus, wherein the print apparatus prints an image based on the image data and the information of the trimming range transferred by the transferring unit.

According to the present invention, there is provided an image supply apparatus which directly communicates with a print apparatus that prints an image, and supplies image data to the print apparatus, the apparatus comprising: a designating unit adapted to designate a print image from image data which is stored in a storage unit; a setting unit adapted to set a printing condition including a trimming range and a print size of the print image; a modifying unit adapted to resize image data of the print image based on the printing condition set by the setting unit; and a transferring unit adapted to transfer the image data of the print image resized by the modifying unit, and information of the trimming range to the print apparatus.

According to the present invention, there is provided a method of controlling a print system in which an image supply apparatus and a print apparatus directly communicate with each other, and the print apparatus prints an image based on image data supplied from the image supply apparatus, the image supply apparatus executing: a designating step of designating a print image from image data which is stored in a storage unit; a setting step of setting a printing condition including a trimming range and a print size of the print image; a modifying step of resizing image data of the print image based on the printing condition set in the setting step; and a transferring step of transferring the image data of the print image resized in the modifying step, and information of the trimming range to the print apparatus, wherein the print apparatus prints an image based on the image data and the information of the trimming range transferred in the transferring step.

According to the present invention, there is provided a method of controlling an image supply apparatus which directly communicates with a print apparatus that prints an image, and supplies image data to the print apparatus, the method comprising: a designating step of designating a print image from image data which is stored in a storage unit; a setting step of setting a printing condition including a trimming range and a print size of the print image; a modifying step of resizing image data of the print image based on the printing condition set in the setting step; and a transferring step of transferring the image data of the print image resized in the modifying step, and information of the trimming range to the print apparatus.

According to the present invention, upon trimming and printing an image, the image clipped by trimming can be printed with high precision and at high speed while preventing the brightness and contrast from changing depending on the clipping position.

Further features of the present invention will become apparent from the following description of exemplary embodiments with reference to the attached drawings.

BRIEF DESCRIPTION OF THE DRAWINGS

FIG. 9 is a flowchart showing the generation process of a print job file to be executed by the DSC;

DESCRIPTION OF THE EMBODIMENTS

The best mode of carrying out the invention will be described in detail hereinafter with reference to the accompanying drawings.

Note that embodiments to be described below are merely examples to practice the present invention and should be modified or changed depending on the arrangement of an apparatus, to which the present invention is applied, and various conditions, and the present invention is not limited to the embodiments to be described below.

[System Arrangement]

An embodiment of a direct print process between a digital still camera (DSC) and printer will be described below.

Figure 1:
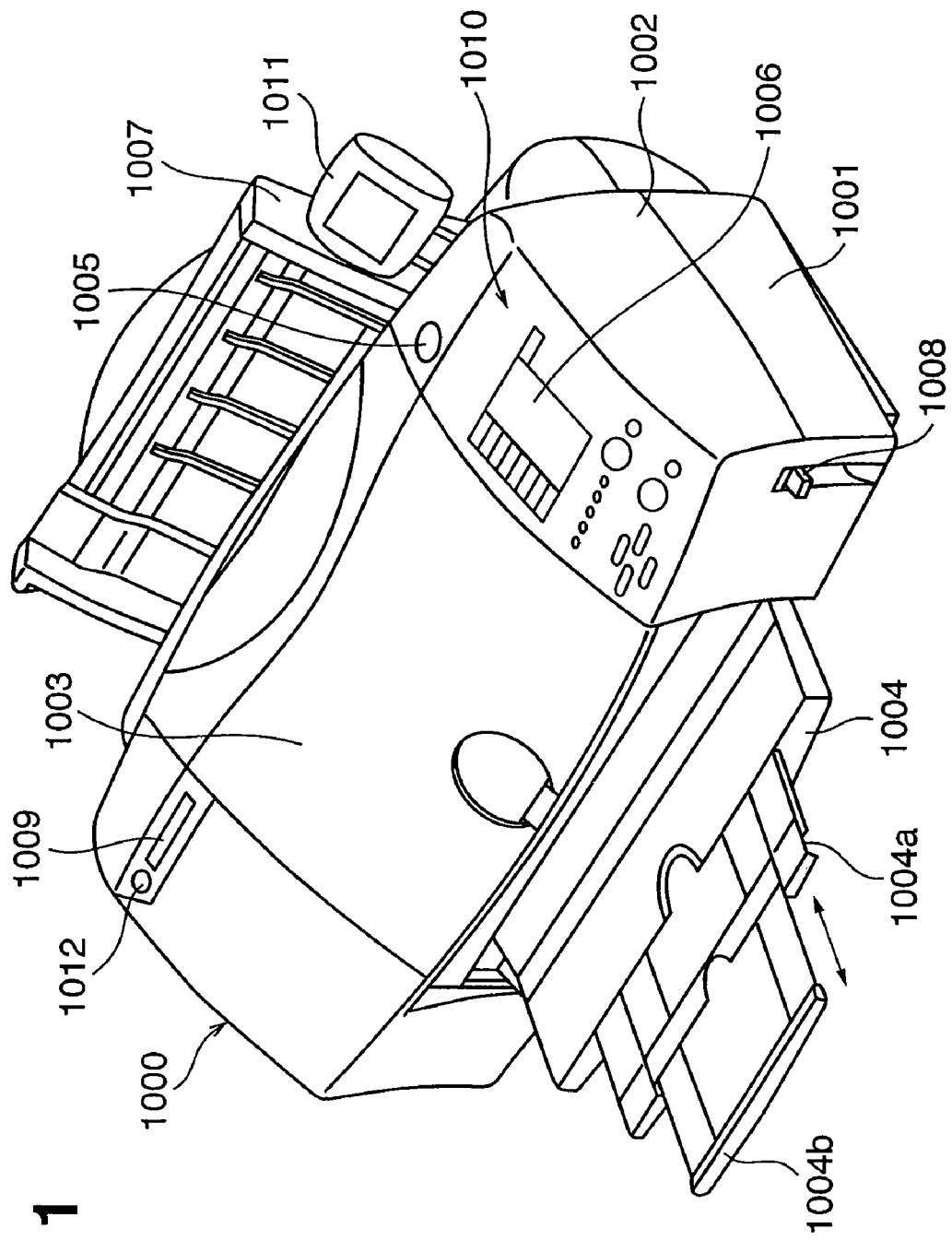
FIG. 1 is a schematic perspective view of a photo direct printer according to one embodiment of the present invention.

FIG. 1 is a schematic perspective view of a photo direct printer (to be referred to as PD printer hereinafter) 1000 according to one embodiment of the present invention.

This PD printer 1000 comprises a function of printing data received from a host computer (PC) as a normal PC printer. The PD printer 1000 comprises a function of printing image data directly read from a storage medium such as a memory card or the like, or a function of printing image data transferred from a DSC, PDA, or the like.

Referring to FIG. 1, a main body that forms an outer shell of the PD printer 1000 of this embodiment has exterior members: a lower case 1001, upper case 1002, access cover 1003, and discharge tray 1004. The lower case 1001 nearly forms the lower half of the PD printer 1000, and the upper case 1002 nearly forms the upper half of the main body. These two cases are combined to form a hollow structure having a storage space that stores respective mechanisms to be described later, and have openings on upper and front surfaces. Furthermore, one end of the discharge tray 1004 is rotatably held by the lower case 1001. Rotation of the discharge tray 1004 opens/closes the opening formed on the front surface of the lower case 1001. Upon execution of a print operation, the discharge tray 1004 rotates toward the front surface side to open the opening, so that printed sheets (including plain paper sheets, dedicated paper sheets, resin sheets, and the like) can be discharged from that opening. The discharged print sheets are stacked on the discharge tray 1004 in turn. The discharge tray 1004 stores two auxiliary trays 1004a and 1004b. When these trays are pulled out as needed, the support area of print sheets can be enlarged/reduced in three steps.

One end of the access cover 1003 is rotatably held by the upper case 1002 to be able to open/close the opening formed on the upper surface of the main body. When the access cover 1003 is opened, the user can exchange a printhead cartridge (not shown), ink tanks (not shown), or the like housed in the main body. Although particularly not shown, when the access cover is opened/closed, a projection formed on the rear surface of the access cover 1003 rotates a cover open/close lever. By detecting the rotation position of that lever using a microswitch or the like, the open/close state of the access cover 1003 can be detected.

A power key 1005 is arranged on the upper surface of the upper case 1002. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds sheets into the main body of the apparatus. Reference numeral 1008 denotes a paper gap select lever which is used to adjust the gap between the printhead and sheet. Reference numeral 1009 denotes a card slot which receives an adapter that can receive a memory card. Via this adapter, image data stored in the memory card can be directly read and printed. As this memory card, for example, a Compact Flash card® memory card, SmartMedia card, Memory Stick, and the like are available. Reference numeral 1011 denotes a viewer (liquid crystal display unit) which is detachable from the main body of this PD printer 1000, and is used to display an image for one frame, index images, and the like upon, for example, searching images stored in the PC card for an image to be printed. Reference numeral 1012 denotes a USB terminal used to connect a DSC (to be described later). Also, another USB connector used to connect a PC is provided on the rear surface of this PD printer 1000.

[Arrangement of Control Panel]

Figure 2:
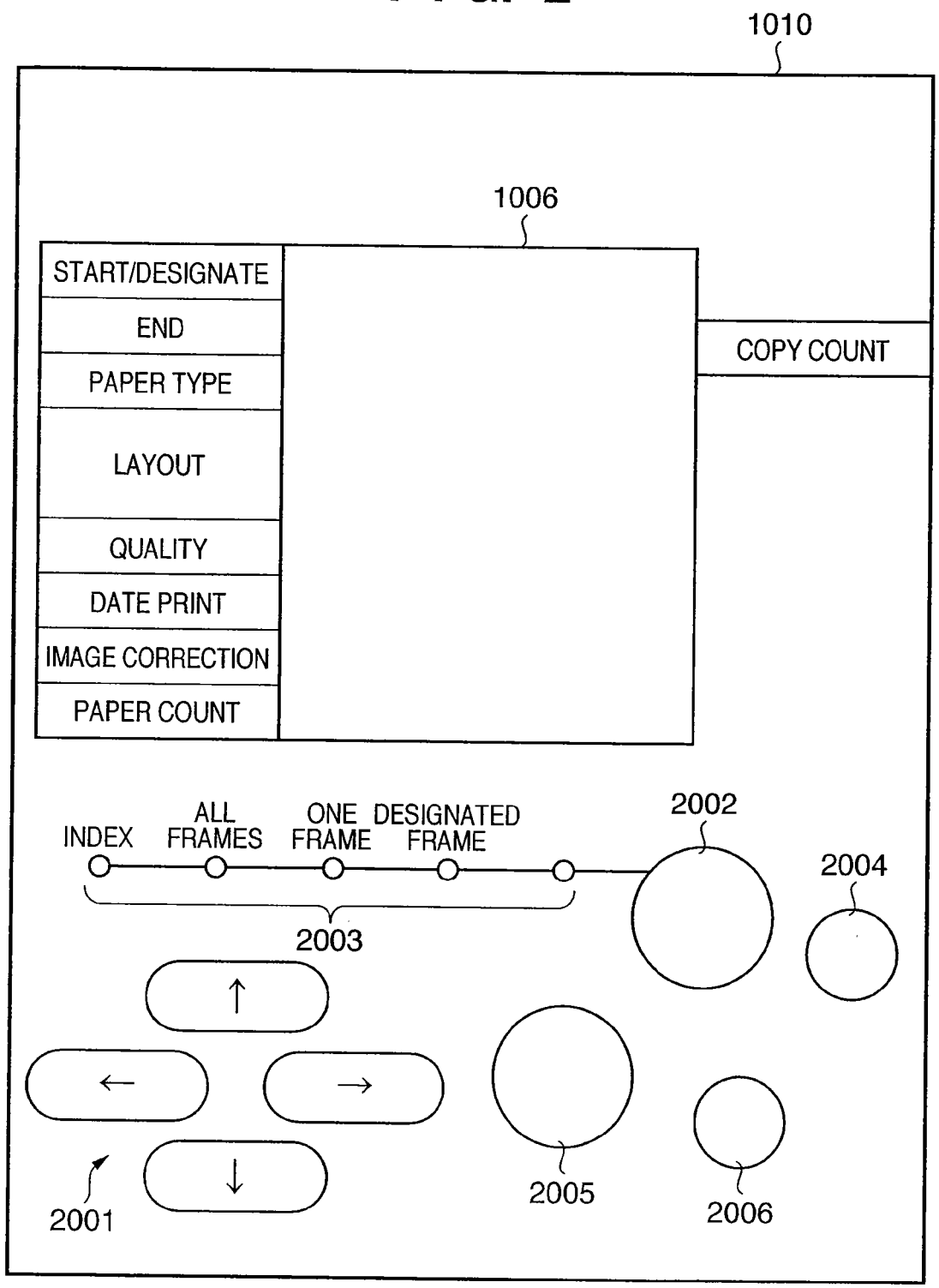
FIG. 2 is a schematic view of a control panel of the PD printer according to the embodiment of the present invention.

FIG. 2 is a schematic view of the control panel 1010 of the PD printer 1000 according to this embodiment.

Referring to FIG. 2, the liquid crystal display unit 1006 displays menu items used to set data associated with item names printed on the right and left sides of the unit 1006. The items displayed on this unit include, for example, the first or designated frame number (start frame designation/print frame designation) and the last photo number (end) of photo images to be printed, the number of copies to be printed (copy count), the type of sheet used in the print process (paper type), the setting of the number of photos to be printed per sheet (layout), designation of print quality (quality), designation as to whether or not to print a photographing date (date print), designation as to whether or not to print a photo after correction (image correction), indication of the number of print sheets required for the print process (print sheet count), and the like. The user can select or designate these items using cursor keys 2001.

Reference numeral 2002 denotes a mode key. Every time the user presses this key, the type of print (index print, all-frame print, one-frame print, designated frame print, and the like) can be switched, and a corresponding one of LEDs 2003 is turned on in accordance with the selected type of print.

Reference numeral 2004 denotes a maintenance key which is used to do maintenance of the printer (e.g., cleaning of the printhead, and the like). Reference numeral 2005 denotes a print start key which is pressed to give the instruction for the start of a print process or to settle the maintenance setting.

Reference numeral 2006 denotes a print cancel key which is pressed to cancel the print process or maintenance.

[Arrangement of PD Printer]

The arrangement of principal parts associated with the control of the PD printer 1000 of this embodiment will be described below. Note that the same reference numerals in FIG. 3 denote parts common to those in the above-mentioned drawings, and a repetitive description thereof will be avoided.

Figure 3:
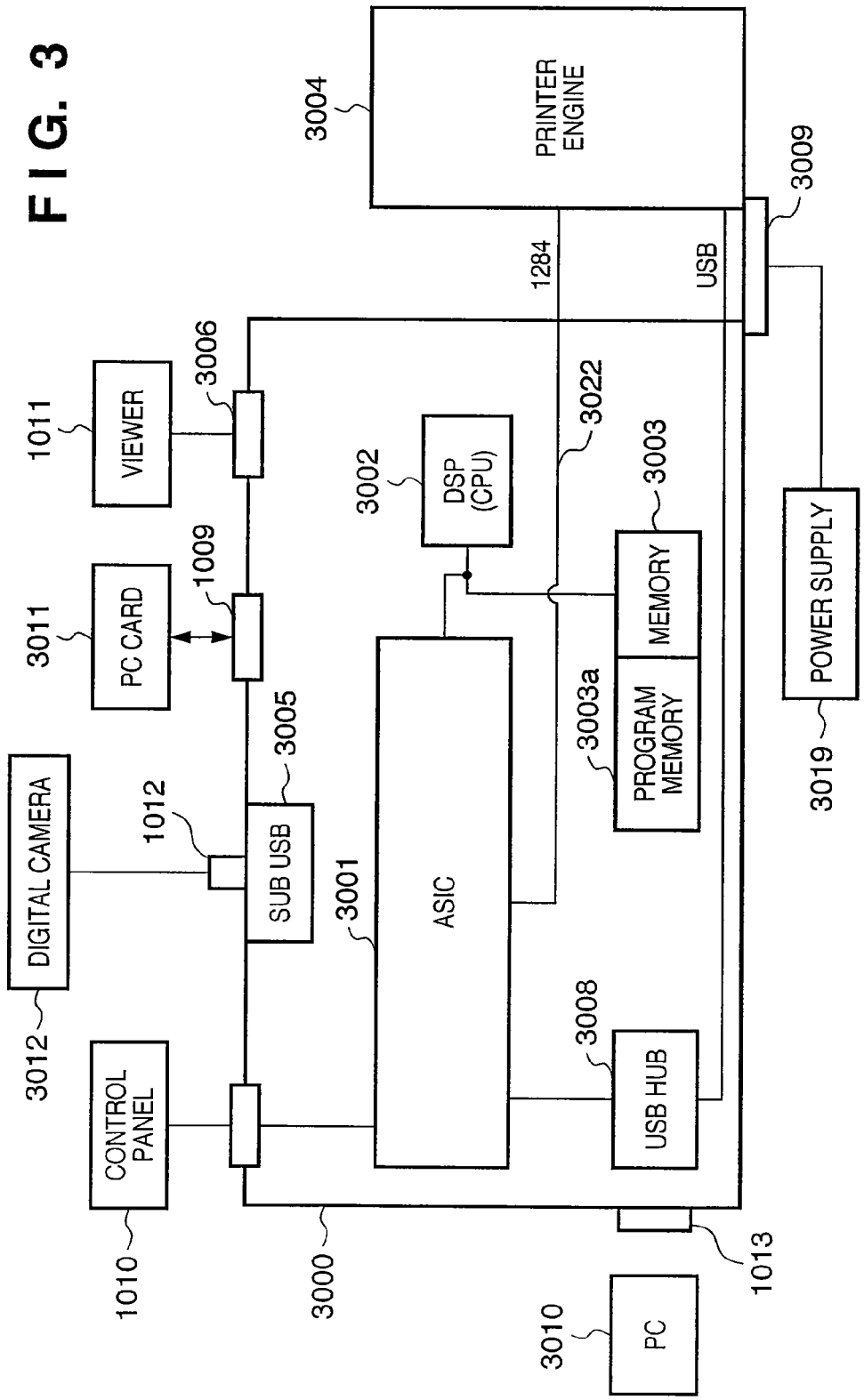
FIG. 3 is a block diagram showing the arrangement of principal parts associated with the control of the PD printer according to the embodiment of the present invention.

FIG. 3 is a block diagram showing the arrangement of principal parts associated with the control of the PD printer according to this embodiment.

Referring to FIG. 3, reference numeral 3000 denotes a controller (control board). Reference numeral 3001 denotes an ASIC (dedicated custom LSI). Reference numeral 3002 denotes a DSP (digital signal processor), which includes a CPU and executes various kinds of control to be described later, and image processes such as conversion from luminance signals (RGB) into density signals (CMYK), scaling, gamma conversion, error diffusion, and the like.

Reference numeral 3003 denotes a memory, which has a memory area that serves as a program memory 3003a for storing control programs to be executed by the CPU of the DSP 3002, a RAM area for storing running programs, and a work area for storing image data and the like.

Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011.

Reference numeral 3008 denotes a USB hub (USB HUB). When the PD printer 1000 executes a print process based on image data from a PC 3010, the USB hub 3008 passes data received from the PC 3010, and outputs the data to the printer engine 3004 via a USB 3021. In this way, the PC 3010 connected to the printer can execute a print process by directly exchanging data, signals, and the like with the printer engine 3004 (the printer serves as a normal PC printer).

Reference numeral 3009 denotes a power supply connector, which inputs a DC voltage which is converted from commercial AC power by a power supply 3019. The PC 3010 is a general personal computer (PC). Reference numeral 3011 denotes a memory card (PC card) mentioned above; and 3012, a digital still camera (DSC).

Note that this controller 3000 and printer engine 3004 exchange signals via the USB 3021 or an IEEE1284 bus 3022.

[Description of Digital Camera]

Figure 4:
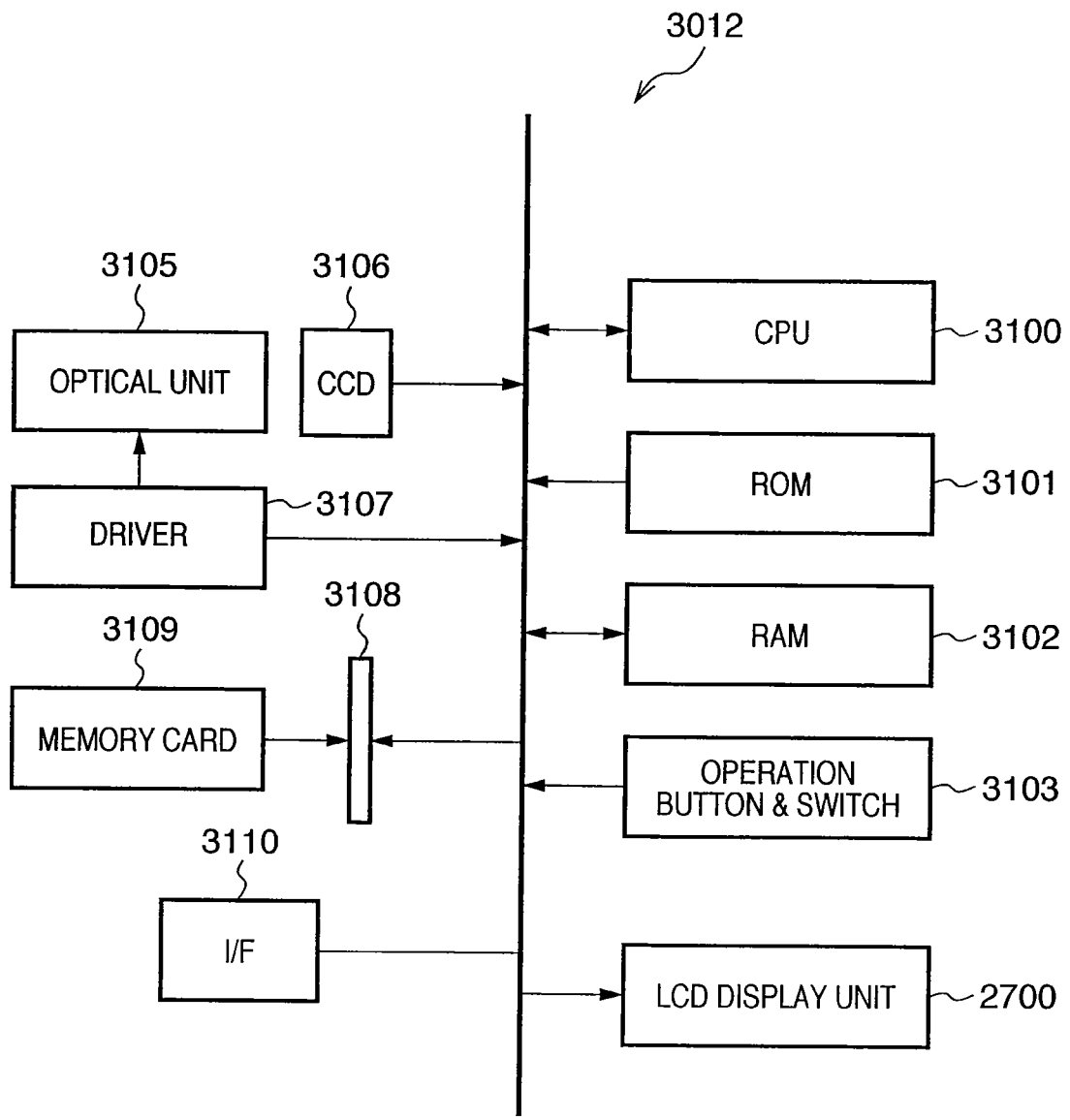
FIG. 4 is a block diagram showing the arrangement of a DSC according to the embodiment of the present invention.

FIG. 4 is a block diagram showing the arrangement of the DSC 3012 according to this embodiment.

Referring to FIG. 4, reference numeral 3100 denotes a CPU which controls the overall DSC 3012; and 3101, a ROM that stores the processing sequence of the CPU 3100. Reference numeral 3102 denotes a RAM which is used as a work area of the CPU 3100; and 3103, a switch group used to make various operations. The switch group 3103 includes a shutter, mode switch, select switch, cursor keys, and the like.

Reference numeral 2700 denotes an LCD display unit, which is used to display a currently captured image, and captured images stored in the memory card, and a menu upon making various settings. Reference numeral 3105 denotes an optical unit which mainly comprises a lens and its drive system. Reference numeral 3106 denotes a CCD element; and 3107, a driver which controls driving of the optical unit 3105 under the control of the CPU 3100.

Reference numeral 3108 denotes a connector that receives a storage medium 3109 (Compact Flash®, SmartMedia, or the like); and 3110, a USB interface (the-slave side of the USB) used to connect the PC or PD printer 1000.

Figure 5:
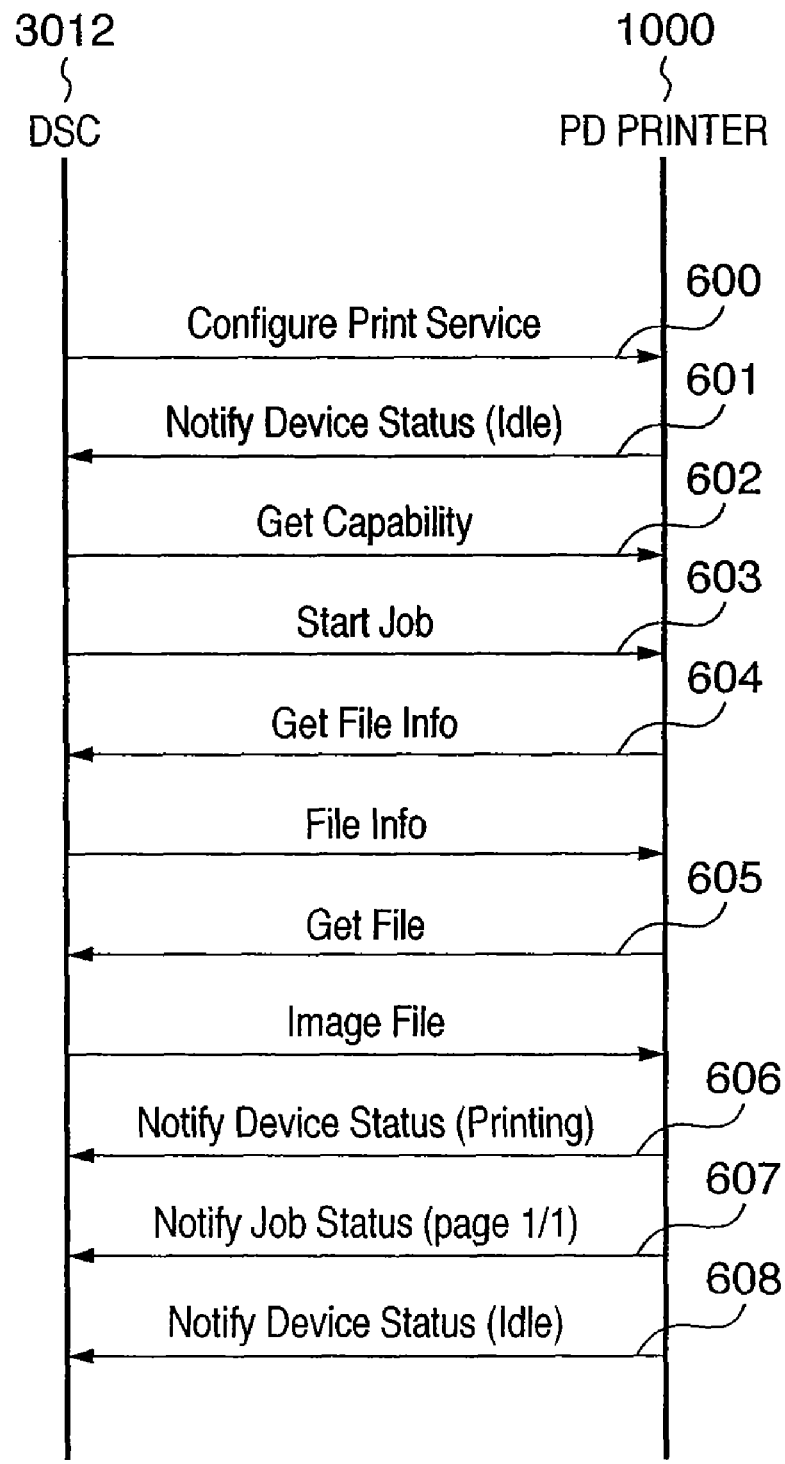
FIG. 5 is a chart for explaining the sequence for executing a print process after the DSC issues a print start request to the PD printer.

[Description of FIG. 5]

FIG. 5 is premised on that the DSC 3012 and PD printer 1000 support a predetermined direct print protocol. FIG. 5 is a chart for explaining the process sequence for executing the print process after the DSC 3012 issues a print start request to the PD printer 1000.

This process sequence is executed after the PD printer 1000 and DSC 3012 communicate with each other since they are connected via a USB cable or wirelessly and confirm each other if they are compliant to the direct print protocol.

The DSC 3012 sends "Configure Print Service" to the PD printer 1000 to check the status of the PD printer 1000 (600). In response to this request, the PD printer 1000 notifies the DSC 3012 of its status at that time (in this case, "Idle" status) using "Notify Device Status" (601). Since the status of the PD printer 1000 is "Idle", the DSC 3012 inquires the PD printer 1000 about its Capability (602: Get Capability), and issues a print start request (Start Job) according to that Capability (603). Note that this print start request is issued from the DSC 3012 to the PD printer 1000 under the condition that "new-JobOK" in status information from the PD printer 1000 (to be described later) is "True" in the response 601.

In response to this print start request, the PD printer 1000 requests the DSC 3012 to send file information based on the file ID of image data, the print process of which is instructed (604: Get File Info). In response to this request, the DSC 3012 sends that file information (File Info). This file information includes information of a file size and the like. If the PD printer 1000 receives that file information and determines that it can process the image data, it requests the DSC 3012 to send that image file (605: Get File). In response to this request, the DSC 3012 sends the requested image data file (Image File) to the PD printer 1000. When starting the print process, the PD printer 1000 notifies the DSC 3012 of status information indicating "Printing" using "Notify Device Status" (606). Upon completion of the print process for one page, the PD printer 1000 notifies the DSC 3012 of "page1/1" using "Notify Job Status" (607). If only one page is to be printed, and the print process of one page to be printed is complete, the PD printer 1000 notifies the DSC 3012 of the "Idle" status using "Notify Device Status" (608).

For example, in case of an N-up print mode that lays out and prints a plurality of (N) images per page, every time N images are printed, the PD printer 1000 sends "Notify Job Status" (607) to the DSC 3012. The order of the issuance timings of "Notify Job Status" and "Notify Device Status", and acquisition of image data in this embodiment are merely an example, and there are various modes depending on implementation of products.

Figure 6:
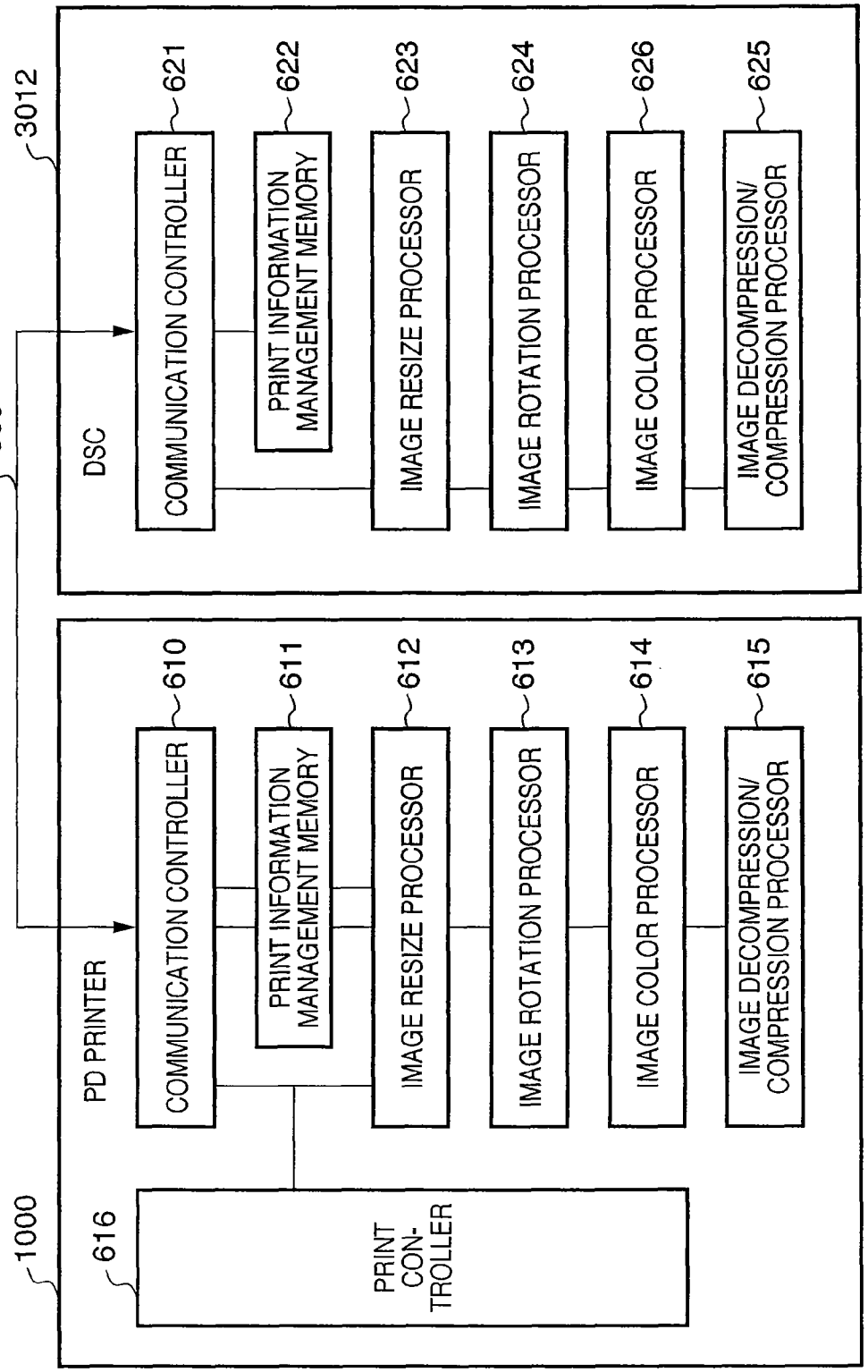
FIG. 6 is a functional block diagram showing the arrangement of a print system according to the embodiment of the present invention.

[Description of FIG. 6]

FIG. 6 is a functional block diagram showing the arrangement of a print system according to this embodiment.

In this print system, the PD printer 1000 and DSC 3012 are connected to each other so as to directly communicate with each other via a communication interface 660 such as USB or the like. Note that the communication interface 660 is not limited to a wired interface but may also be a wireless interface such as Bluetooth or the like.

The PD printer 1000 comprises a communication controller 610 which makes communication control via the communication interface 660, and a print information management memory 611 which includes a print buffer, reception buffer, and the like. Also, the PD printer 1000 comprises an image resize processor 612 which executes a resize process of an image size, an image rotation processor 613 which executes a rotation process of an image, and an image color processor 614 which executes color conversion of an image. Furthermore, the PD printer 1000 comprises an image decompression/compression processor 615 which compresses and decompresses image data, and a print controller 616 including the printer engine 3004 (FIG. 3) and the like. In this embodiment, the image resize processor 612, image rotation processor 613, image color processor 614, and image decompression/compression processor 615 are implemented by the DSP 3002 shown in FIG. 3 and programs stored in the program memory 3003a.

The DSC 3012 comprises a communication controller 621 which makes communication control via the communication interface 660, and a print information management memory 622 which includes the RAM 3102 that temporarily stores image data whose print image file (to be described later) has already been generated, and the like. The DSC 3012 comprises an image resize processor 623 which executes a resize process of an image size, an image rotation processor 624 which executes a rotation process of an image, an image decompression/compression processor 625 which compresses and decompresses image data, and an image color processor 626 which executes a color conversion process. In this embodiment, the image resize processor 623, image rotation processor 624, image decompression/compression processor 625, and image color processor 626 are implemented by the CPU 3100 shown in FIG. 4 and programs stored in the ROM 3101.

Figure 7:
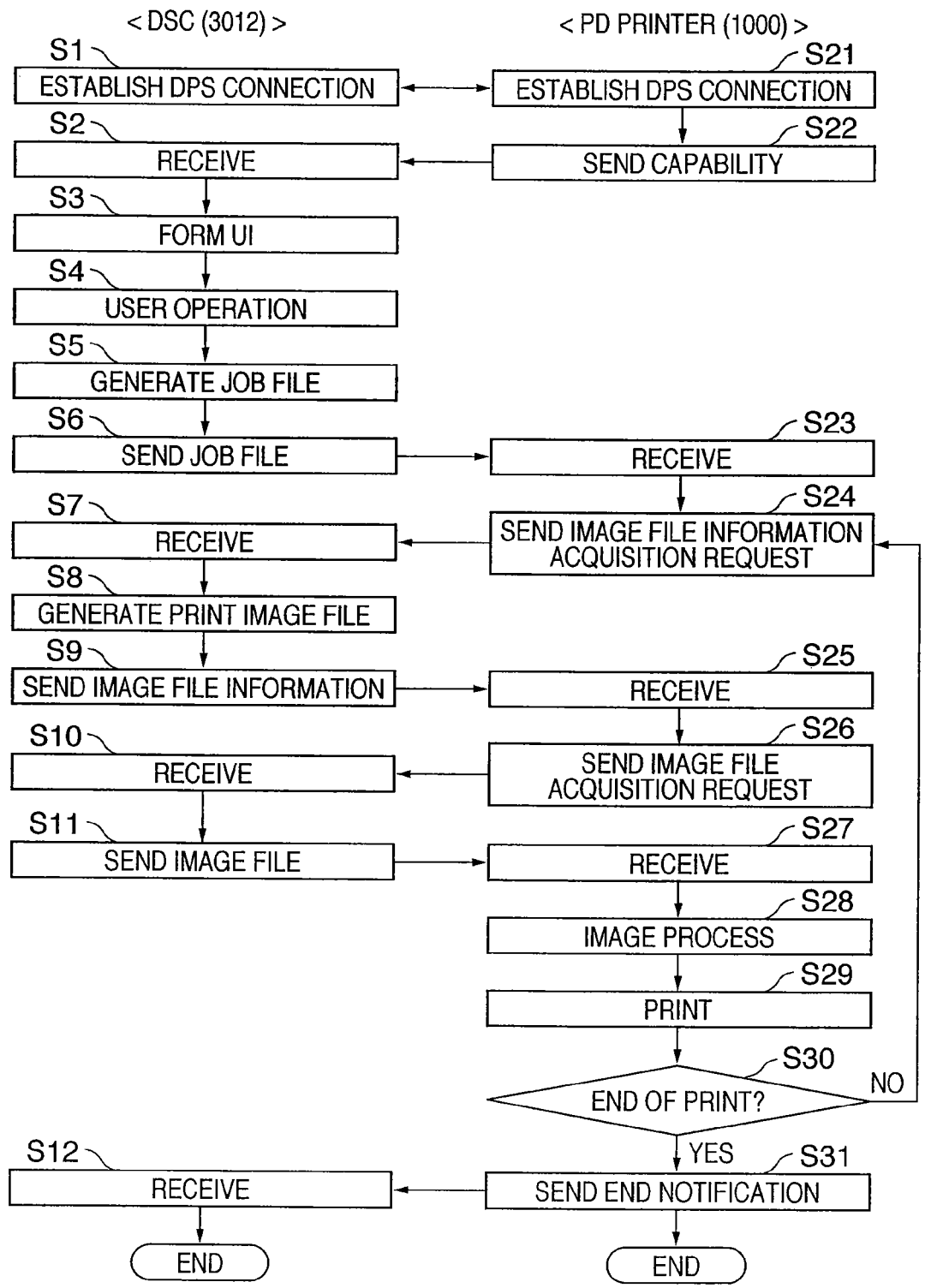
FIG. 7 is a flowchart showing the process executed when the DSC and PD printer according to the embodiment of the present invention communicate with each other to supply image data from the DSC to the PD printer, and execute a print process.

[Description of FIG. 7]

FIG. 7 is a flowchart showing the process executed when the DSC 3012 and PD printer 1000 according to this embodiment directly communicate with each other to supply image data from the DSC 3012 to the PD printer 1000, and execute a print process.

In FIG. 7, steps S1 to S12 indicate processes to be executed by the DSC 3012, and steps S21 to S31 indicate those to be executed by the PD printer 1000.

In steps S1 and S21, the DSC 3012 and PD printer 1000 confirm each other if they are compliant to the direct print protocol. The DSC 3012 inquires the PD printer 1000 about the printer status and device information. In response to this inquiry, the PD printer 1000 notifies the DSC 3012 of the printer status and device information at that time. The device information includes, for example, the version of the connection protocol, the vendor name and model name of the printer, and the like.

The DSC 3012 sends a Capability request to the PD printer 1000, as denoted by 602 in FIG. 5. In response to this request, the PD printer 1000 generates capability information (Capability) about its print functions and sends it to the DSC 3012 in step S22.

Upon reception of the Capability information from the PD printer 1000 (step S2), the DSC 3012 forms a UI (user interface) window based on this Capability information, and displays it on the display unit 2700 in step S3. For example, the PD printer 1000 stores A4- and B5-sized plain paper sheets and photo paper sheets, and the user can arbitrarily set print modes such as 1-up, 2-up, 4-up, "borderless/bordered", rotation, trimming, date print, and the like via the UI window on the display unit 2700.

In step S4, the user selects one or more images to be printed and sets printing conditions for these images with reference to the UI window on the display unit 2700. The printing conditions include the number of sheets to be printed, paper size, ON/OFF of the date print mode, trimming designation, borderless/bordered, and the like, and are based on the Capability information of the PD printer 1000 received in step S2.

If the user issues a print start instruction via the UI window, the process advances to step S5, and the DSC 3012 generates a print job file used to issue a print instruction to the PD printer 1000. In step S6, the DSC 3012 sends the generated print job file to the PD printer 1000. The PD printer 1000 receives the print job file in step S23.

In step S24, the PD printer 1000 analyzes the print job file received from the DSC 3012, and sends, to the DSC 3012, an "acquisition request of image file information" to be printed described in the print job file. This image file information is not data for the main body of an image file, but includes attribute information such as a file name, image format information, image data size, and the like. The types of attribute information are not limited to these, and any other types of information may be applied as long as they are managed in association with an image. Note that in a service which runs based on a PTP (Picture Transfer Protocol) on the USB, the "acquisition request of image file information" corresponds to "Get Object Info" specified by that PTP. The "acquisition request of image file information" is used to impart the generation timing of an image file to be sent in step S11 from the PD printer 1000 to the DSC 3012.

Upon reception of the "acquisition request of image file information" in step S7, the DSC 3012 generates a print image file to be sent to the PD printer 1000 in step S8. Detailed processes in step S8 will be described later.

In step S9, the DSC 3012 sends the print image file (image file name, data size, etc.) generated in step S8 to the PD printer 1000.

Upon reception of the print image file information from the DSC 3012 in step S25, the PD printer 1000 sends an acquisition request for the main body of an image file to be printed to the DSC 3012 (step S26). Upon reception of the image file acquisition request from the PD printer (step S10), the DSC 3012 sends the requested image file to the PD printer 1000 (step S31).

Upon reception of the image file to be printed in step S27, the PD printer 1000 decodes that image file, applies image processes to convert the image file into data of a format that the PD printer 1000 can print, and executes a print process based on the converted image data (steps S28 and S29).

The PD printer 1000 checks in step S30 if the print process of the image data is completed up to its end. If the print process is not completed yet, the PD printer 1000 cannot assure a buffer area large enough to store the received image data, and may divisionally receive the image file information in step S27. For this reason, the process returns to step S24 to send the "acquisition request of image file information" again to the DSC 3012, and the PD printer 1000 receives partial data of the image data in step S27 to print it out.

If it is determined in step S30 that the print process of the image data is complete up to its end, the process advances to step S31, and the PD printer 1000 notifies the DSC 3012 of the end of the print process of the image file. Upon reception of the print end notification in step S12, the DSC 3012 ends this process.

Figure 8A:
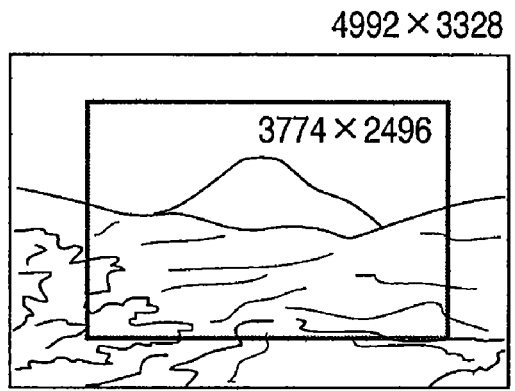
FIG. 8A shows an image captured by the DSC.

FIG. 8A shows an image (4992 pixels (width)×3328 pixels (height)) captured by the DSC 3012, for which the user designates trimming to a trimming frame (3774 pixels (width)×2496 pixels (height)).

Figure 8B:
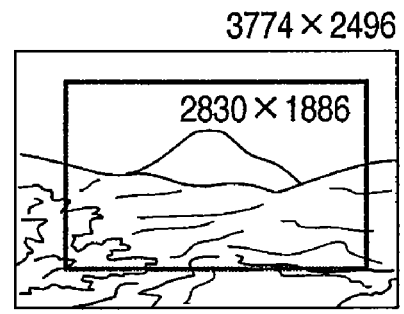
FIG. 8B shows an image obtained by resizing the image shown in FIG. 8A based on the numbers of pixels in the vertical and horizontal directions of an image to be printed.

FIG. 8B shows an image (3774 pixels (width)×2496 pixels (height)) obtained by resizing the image shown in FIG. 8A based on the numbers of pixels in the vertical and horizontal directions of an image to be printed by the PD printer 1000. Also, FIG. 8B shows an example in which the trimming frame is resized to a size (2830 pixels (width)×1886 pixels (height)).

Figure 8C:
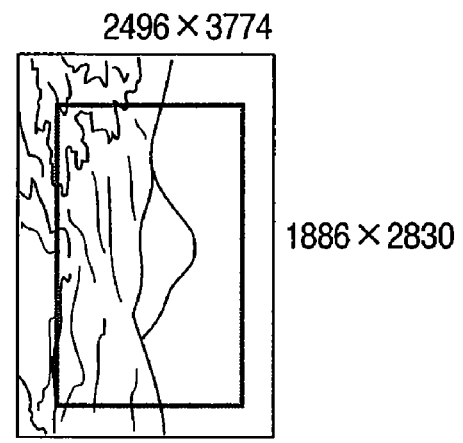
FIG. 8C shows an image obtained by resizing and rotating the image shown in FIG. 8A.

FIG. 8C shows an image (2496 pixels (width)×3774 pixels (height)) obtained by resizing and rotating the image shown in FIG. 8A based on the numbers of pixels in the vertical and horizontal directions of the image to be printed by the PD printer 1000. Also, FIG. 8C shows an example in which the trimming-frame is also resized and rotated to a size (1886 pixels (width)×2830 pixels (height)).

Figure 8D:
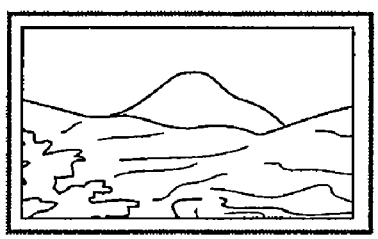
FIG. 8D shows a print result printed in a bordered mode.
Figure 8E:
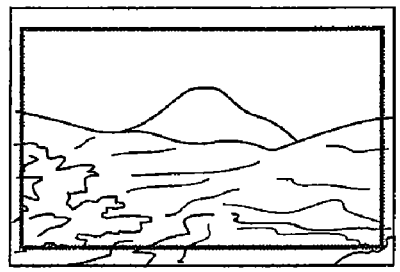
FIG. 8E shows a print result printed in a borderless mode.

FIG. 8D shows a print result output in the bordered print mode, and FIG. 8E shows a print result output in the borderless print mode.

[Description of FIG. 9]

FIG. 9 is a flowchart showing the print job file generation process executed by the DSC 3012 of this embodiment, which process corresponds to steps S2 to S4 in FIG. 7.

In step S101, the DSC 3012 receives Capability information from the PD printer 1000, and acquires the printable paper size, resolution, and the like of the PD printer 1000. The PD printer 1000 calculates the numbers of pixels in the vertical and horizontal directions of image data required in the print process, and notifies the DSC 3012 of the calculation result using the Capability information. The numbers of pixels are calculated based on the paper size stored in the PD printer 1000, the print settings set on an operation unit of the PD printer, and the capabilities of a memory of the PD printer and the like. Information associated with the numbers of pixels in the vertical and horizontal directions of the image to be printed, which is received by the DSC 3012, is stored in the RAM 3102 of the DSC 3012. When the PD printer 1000 is of a model that cannot notify the DSC 3012 of the numbers of pixels of an image, the DSC 3012 looks up a table or the like based on information obtained from that printer such as the vendor name, model name, version number, and the like of the printer. Then, the DSC 3012 obtains information such as the numbers of pixels in the vertical and horizontal directions, rotation direction, and the like for each print sheet, and calculates the numbers of pixels of an image to be printed.

In step S102, the user selects an image to be printed from the UI window displayed on the display unit 2700.

In step S103, the user selects a paper size used to print the image to be printed.

In step S104, the user sets a print layout such as "bordered/borderless", "rotation direction of an image", and the like.

In step S105, the user designates a frame size and position of trimming if he or she wants to trim the image.

In step S106, the user sets parameters required for printing. If the user issues a print start instruction via the UI window, the DSC 3012 begins to generate a print job file. The print job file includes information that designates the image to be printed, trimming setting information, and information associated with a print size and image correction process. Note that the trimming information is also included and recorded in image data.

The processes in steps S102 to S106 correspond to step S4 in FIG. 7, and the DSC 3012 sends the generated print job file to the PD printer 1000 to issue a print start request (603 in FIG. 5).

Figure 10:
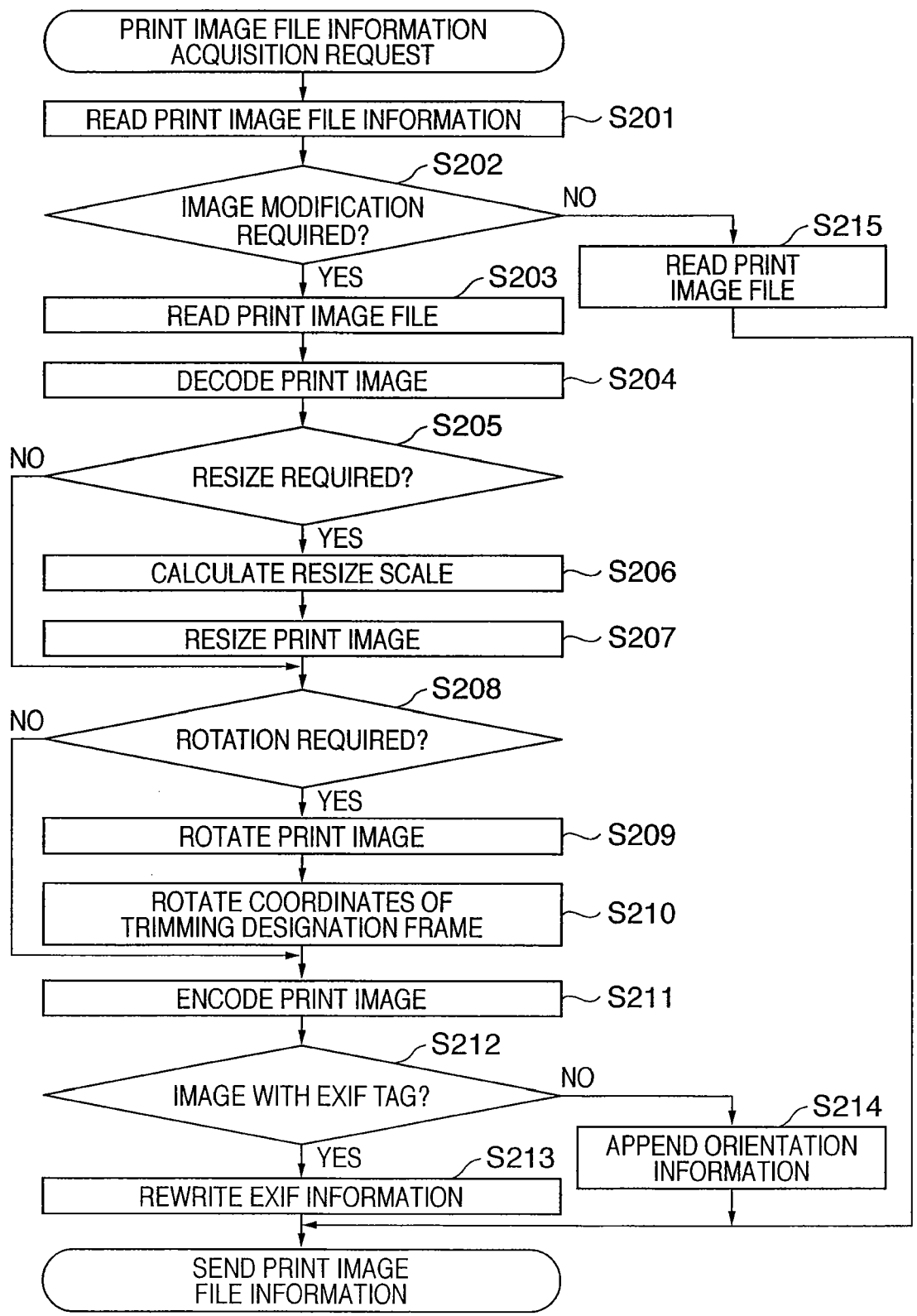
FIG. 10 is a flowchart showing the generation process of a print image file by the DSC.

[Description of FIG. 10]

FIG. 10 is a flowchart showing the print image file generation process executed by the DSC 3012 of this embodiment, which corresponds to steps S7 to S9 in FIG. 7.

The process in FIG. 10 starts upon reception of the "acquisition-request of image file information (S24 in FIG. 7)" from the PD printer 1000. In step S201, the DSC 3012 acquires information of an image included in the print job file as the basis of that acquisition request.

The DSC 3012 checks in step S202 based on the printing conditions of the PD printer 1000 and image data of the image file to be printed if modification processes such as resizing, rotation, trimming, and the like of that image data are required. If the modification processes are not required, the process advances to step S215. In step S215, the DSC 3012 reads out information of the image file to be printed from the memory card 3109, and transfers it to the PD printer 1000.

On the other hand, if the modification processes are required, the process advances to step S203. In step S203, the DSC 3012 reads the image file to be printed. If that image is to be decoded, the DSC 3012 decodes the image data to convert it into original image data in step S204.

In step S205, the DSC 3012 compares the numbers, of pixels in the vertical and horizontal directions required for printing by the PD printer 1000, which are determined based on the paper size, with the trimming frame size of the image to be printed, and checks if the resize process required for the image data. For example, assume that the trimming frame of 3774×2496 is designated for the original image size (4992×3328) in FIG. 8A, and the numbers of pixels required for printing in FIG. 8B are 2830×1886. That is, if the numbers of pixels in the vertical and horizontal directions (3774×2496 in FIG. 8A) of the trimming frame of the original image are larger than those (2830×1886 in FIG. 8B) required for printing by the PD printer 1000, it is determined that the resize process is required. If the resize process is required, the process advances to step S206; otherwise, the process jumps to step S208.

In step S206, the image resize processor 623 calculates a scale based on the trimming frame size of the image to be printed and the numbers of pixels required for printing (to be described later with reference to FIG. 12).

In step S207, the image resize processor 623 resizes the image data to the calculated scale.

The DSC 3012 checks in step S208 based on the print paper size, print layout, and trimming frame size set in steps S103 to S105 in FIG. 9 if the rotation process of the print image is required. That is, the DSC 3012 determines according to the orientation of paper sheets set in the printer, and the direction of the image to be laid out if the rotation process of the image data is required upon printing. If the rotation process is not required, the process jumps to step S211; otherwise, the process advances to step S209.

In steps S209 and S210, the image rotation processor 624 rotates the print image and also the trimming frame in the same direction as the rotation direction of the print image. That is, the image rotation processor 624 rotates the coordinates of the trimming frame set by the user in step S105 in the same manner as the image. The converted coordinates of the trimming frame are recorded together with the image data. As the recording method, the coordinate information is recorded in a JPEG file together as attribute information of a JPEG image.

In step S211, the image decompression/compression processor 625 compresses the image data that has undergone the resize process and/or the rotation process. In this embodiment, the compression method will not be specified. In general, a compression method that the PD printer 1000 can handle such as lossless compression represented by PackBits and the like, lossy compression represented by JPEG and the like, and so forth is adopted. The DSC 3012 checks in step S212 if the image data encoded in this manner is appended with EXIF tags. If the image data is appended with EXIF tags, in step S213 the DSC 3012 updates the EXIF information in correspondence with the processes in steps S202 to S211. On the other hand, if it is determined in step S212 that the image data is not appended with EXIF tags, the DSC 3012 appends orientation information to the encoded image data in step S214.

The DSC 3012 sends the print image file generated in this way as response data to the "acquisition request of image file information (S24 in FIG. 7)" from the PD printer 1000 (S9 in FIG. 7).

If the image which has undergone the rotation process in step S209 is transferred to the PD printer 1000, and if it is determined in step S212 that the image is appended with EXIF tags, the DSC 3012 rewrites the EXIF information in step S213. Otherwise, the DSC 3012 appends orientation information indicating rotation to the image data in step S214.

Figure 11:
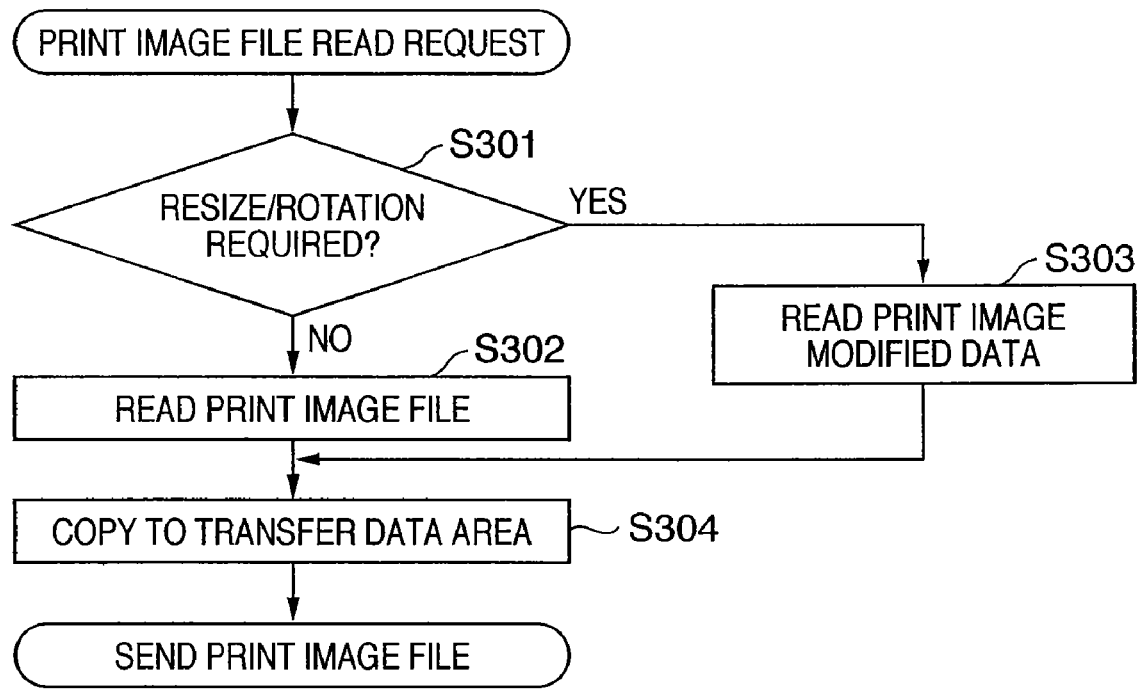
FIG. 11 is a flowchart showing the image file transmission process in a DSC 3012 in response to an "image file acquisition request" from a PD printer 1000.

[Description of FIG. 11]

FIG. 11 is a flowchart showing the image file sending process in the DSC 3012 in response to the "acquisition request of an image file" from the PD printer 1000 in step S26 in FIG. 7, which corresponds to steps S10 and S11 in FIG. 7.

Upon reception of the "acquisition request of an image file" from the PD printer 1000 in step S10 in FIG. 7, the DSC 3012 checks in step S301 if the image data to be printed requires a resize process and/or a rotation process. If such process or processes are required, the process advances to step S303, and the DSC 3012 reads the image file to be printed generated by the process shown in FIG. 10; otherwise, the DSC 3012 reads the image file to be printed stored in the memory card 3109 in step S302.

After that, in step S304 the DSC 3012 stores the image file read in step S302 or S303 in a transfer data area of the RAM 3102, and transfers it to the PD printer 1000 via the communication controllers 621 and 610.

If the image file generated by the aforementioned process in FIG. 10 is stored in the transfer data area of the RAM 3102, the DSC 3012 can skip the processes in steps S301 to S304 in FIG. 11, and needs only to transfer the image file stored in the transfer data area in the process in FIG. 11.

Figure 12:
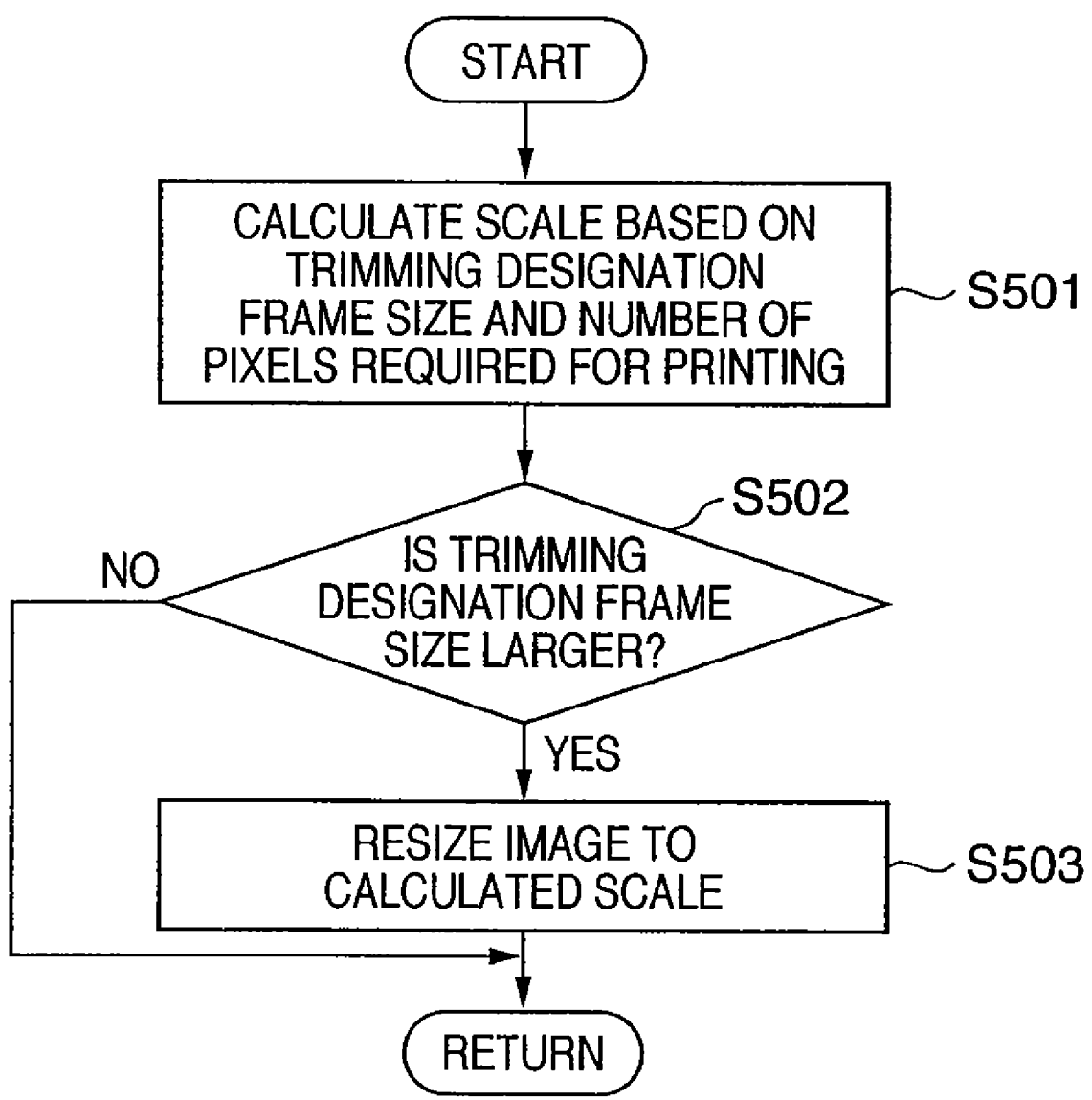
FIG. 12 is a flowchart showing the resize process of a print image by the DSC 3012.

[Description of FIG. 12]

FIG. 12 is a flowchart showing the print image resize process by the DSC 3012 in steps S206 and S207 in FIG. 10.

In step S501, the DSC 3012 acquires the trimming frame size and the numbers of pixels required for printing with reference to the information of the trimming frame recorded together with the image. Let (Ix, Iy) be the image size of the print image, (Tx, Ty) be the trimming frame size, and (Px, Py) be the numbers of pixels required for printing.

In FIGS. 8A and 8B, Ix=4992, Iy=3328, Tx=3774, Ty=2496, Px=2830, and Py=1886. The trimming frame size (Tx, Ty) is compared with the numbers of pixels (Px, Py) required for printing, and a scale formula is given by $(Z)=(Tx)/(Px)$ or $(Z)=(Ty)/(Py)$.

If the scale formula (Z) meets $(Z)>1$ in step S502 (that is, the trimming frame size exceeds the numbers of pixels required for printing), the process advances to step S503.

In step S503, since the print image is resized to the above scale, the image size (Ix×Iy) is roughly changed to 3774×2496 based on an equation $X=(Ix)/(Z)$.

Which of the vertical and horizontal scales is used will not be specified here since they may or may not depend on the printer and layout.

According to this embodiment, when the image size of 4992×3328 is roughly resized to 3774×2496, since the number of pixels is reduced from 16 million pixels to 9 million pixels in a data size, the transfer time can be shorted, and high-speed printing can be realized.

Since an image is not clipped but it is resized, the image data size is reduced independently of the clipping position. Hence, even when the trimming position or size is changed, the histograms suffer nearly no influences. Even when a printer which automatically adjusts the brightness or contrast is connected, stable high image quality can be maintained.

That is, the correction processes based on the features of an original image can be similarly executed independently of whether or not that image is to be trimmed. If an image trimmed by the DSC is transferred to the printer to leave the correction processes to the printer, the aforementioned processes cannot be implemented, and tints change depending on the presence/absence of trimming.

Furthermore, since an image is not clipped in the borderless print mode, this embodiment is particularly effective to a system which prints an image to be larger than an actual paper size so as not to leave any border. That is, data outside the trimming frame exists, and no image outside the trimming frame is cut off, as shown in FIG. 8E. That is, the trimming-designated part can be prevented from being printed outside the paper sheet. Conversely, when an image trimmed according to the trimming designation is sent from the DSC to the PD printer, the print result in which an image of data which is located inside the trimming frame but is printed outside the paper sheet is omitted is obtained in the borderless print mode. In this manner, according to this embodiment, the entire trimming-designated area can be laid out on the print paper sheet irrespective of bordered or borderless designation.

Other Embodiments

The present invention includes a case wherein the invention is achieved by directly or remotely supplying a computer program that implements the functions of the aforementioned embodiments to a system or apparatus. In this case, a computer of the system or the like reads out and executes the computer program.

Therefore, the computer program itself installed in a computer to implement the functional processing of the present invention using the computer implements the present invention.

In this case, the form of the program is not particularly limited, and an object code, a program to be executed by an interpreter, script data to be supplied to an OS, and the like may be used as long as they have the functions of the program.

As a recording medium (storage medium) for supplying the program, for example, a flexible disk, hard disk, optical disk, magneto-optical disk, and the like can be used. In addition, MO, CD-ROM, CD-R, CD-RW, magnetic tape, nonvolatile memory card, ROM, DVD (DVD-ROM, DVD-R), and the like can be used.

As another program supply method, the computer program of the present invention can be downloaded from a home page on the Internet using a browser on a client computer by establishing a connection to that home page. Also, the program can be supplied by downloading a compressed file including an automatic installation function to a recording medium such as a hard disk or the like. Furthermore, the program can be supplied by segmenting the computer program that forms the program of the present invention into a plurality of files, and downloading respective files from different home pages. That is, the present invention includes a WWW server which makes a plurality of users download a program file required to implement the functional processing of the present invention by the computer.

Also, a storage medium such as a CD-ROM or the like, which stores the encrypted program of the present invention, may be delivered to the user, and the user who has cleared a predetermined condition can download key information used to decrypt the encrypted program from a home page via the Internet. In this case, the user executes the encrypted program using the downloaded key information to install the program on a computer.

The functions of the aforementioned embodiments can be implemented when the computer executes the readout program. In addition, the functions of the aforementioned embodiments can be implemented when an OS or the like running on the computer executes some or all of actual processes based on an instruction of that program.

Furthermore, the functions of the aforementioned embodiments can be implemented when the program read out from the recording medium is written in a memory equipped on a function expansion board or a function expansion unit, which is inserted into or connected to the computer, and a CPU of the board or the like then executes some or all of actual processes.

While the present invention has been described with reference to exemplary embodiments, it is to be understood that the invention is not limited to the disclosed exemplary embodiments. The scope of the following claims is to be accorded the broadest interpretation s as to encompass all such modifications and equivalent structures and functions.

This application claims the benefit of Japanese Patent Application No. 2006-198707 filed Jul. 20, 2006, which is hereby incorporated by reference herein in its entirety.

What is claimed is:

1. A print system in which an image supply apparatus and a print apparatus directly communicate with each other, and said print apparatus prints an image based on image data supplied from said image supply apparatus, said image supply apparatus comprising:
a designating unit adapted to designate a print image from image data which is stored in a storage unit;
a setting unit adapted to set a printing condition including a trimming range and a print size of the print image;
a modifying unit adapted to execute a process including a resizing of image data of the print image based on the printing condition set by said setting unit; and
a transferring unit adapted to transfer the image data of the print image processed by said modifying unit, and information of the trimming range to said print apparatus,
wherein the information of the trimming range set by said setting unit is converted based on the process executed by said modifying unit, and the converted information of the trimming range is transferred by said transferring unit and said print apparatus prints an image based on the image data and the converted information of the trimming range transferred by said transferring unit.

2. The system according to claim 1, wherein said modifying unit decides a resize scale based on the trimming range and the print size without using an image size, and executes resizing of the print image without any trimming process of the set trimming range, and said transferring unit transfers image data resized by said modifying unit in accordance with the trimming range and print size, the resized image data including an area other than the trimming range set by said setting unit.

3. The system according to claim 1, wherein when a rotation process of the print image is executed according to a print layout included in the printing condition, said modifying unit executes the rotation process of the print image, and changes the trimming range in a direction agreeing with the rotation direction of the print image.

4. The system according to claim 3, wherein said image supply apparatus further comprises an encoding unit adapted to encode the image data which has undergone one of the resize process and the rotation process by said modifying unit, and said transferring unit encodes the image data which has undergone one of the resize process and the rotation process, and transfers the encoded image data to said print apparatus.

5. The system according to claim 1, wherein when the number of pixels of the trimming range is larger than information of the number of pixels required for printing, which is decided based on the print size, a size of the print image is resized at a scale of the number of pixels required for printing to the number of pixels of the trimming range.

6. An image supply apparatus which directly communicates with a print apparatus that prints an image, and supplies image data to the print apparatus, said apparatus comprising:
a designating unit adapted to designate a print image from image which is stored in a storage unit;
a setting unit adapted to set a printing condition including a trimming range and a print size of the print image;
a modifying unit adapted to execute a process including a resizing of image data of the print image based on the printing condition set by said setting unit; and
a transferring unit adapted to transfer the image data of the print image processed by said modifying unit, and information of the trimming range to said print apparatus,
wherein the information of the trimming range set by said setting unit is converted based on the process executed by said modifying unit, and the converted information of the trimming range is transferred by said transferring unit.

7. The apparatus according to claim 6, wherein said modifying unit decides a resize scale based on the trimming range and the print size without using an image size, and executes resizing of the print image without any trimming process of the set trimming range, and said transferring unit transfers image data resized by said modifying unit in accordance with the trimming range and print size, the resized image data including an area other than the trimming range set by said setting unit.

8. The apparatus according to claim 7, wherein, let (Tx, Ty) be the trimming size set by said setting unit and (Px, Py) be the numbers of pixels required for printing, said modifying unit determines a resizing scale based on a value of (Tx)/(Px) or (Ty)/(Py).

9. The apparatus according to claim 6, wherein when a rotation process of the print image is executed according to a print layout included in the printing condition, said modifying unit executes the rotation process of the print image, and changes the trimming range in a direction agreeing with the rotation direction of the print image.

10. The apparatus according to claim 9, further comprising an encoding unit adapted to encode the image data which has undergone one of the resize process and the rotation process by said modifying unit, wherein said transferring unit encodes the image data which has undergone one of the resize process and the rotation process, and transfers the encoded image data to the print apparatus.

11. The apparatus according to claim 6, wherein when the number of pixels of the trimming range is larger than information of the number of pixels required for printing, which is decided based on the print size, a size of the print image is resized at a scale of the number of pixels required for printing to the number of pixels of the trimming range.

12. The apparatus according to claim 6, wherein the information of the trimming range set by said setting unit is converted to coordinates on the basis of the process executed by said modifying unit, and the converted coordinate information of the trimming range is transferred by said transferring unit.

13. A method of controlling a print system in which an image supply apparatus and a print apparatus directly communicate with each other, and said print apparatus prints an image based on image data supplied from said image supply apparatus, said image supply apparatus executing:
a designating step of designating a print image from image data which is stored in a storage unit;
a setting step of setting a printing condition including a trimming range and a print size of the print image;
a modifying step of executing a process including a resizing of image data of the print image based on the printing condition set in the setting step; and
a transferring step of transferring the image data of the print image processed in the modifying step, and information of the trimming range to said print apparatus,
wherein the information of the trimming range set in said setting step is converted based on the process executed in said modifying step, and the converted information of the trimming range is transferred in said transferring step and said print apparatus prints an image based on the image data and the information of the trimming range transferred in the transferring step.

14. A non-transitory computer-readable storage medium storing a program for making a computer execute a control method according to claim 13.

15. A method of controlling an image supply apparatus which directly communicates with a print apparatus that prints an image, and supplies image data to the print apparatus, said method comprising:
a designating step of designating a print image from image data which is stored in a storage unit;
a setting step of setting a printing condition including a trimming range and a print size of the print image;
a modifying step of executing a process including a resizing of image data of the print image based on the printing condition set in the setting step; and
a transferring step of transferring the image data of the print image processed in the modifying step, and information of the trimming range to the print apparatus,
wherein the information of the trimming range set in said setting step is converted based on the process executed in said modifying step, and the converted information of the trimming range is transferred in said transferring step.

16. A non-transitory computer-readable storage medium storing a program for making a computer execute a control method according to claim 15.

* * * * *